(12) United States Patent
Cao et al.

(10) Patent No.: US 8,559,318 B2
(45) Date of Patent: Oct. 15, 2013

(54) METHOD, NODE AND SYSTEM FOR OBTAINING LINK AGGREGATION GROUP INFORMATION

(75) Inventors: Wei Cao, Santa Clara, CA (US);
Xinchun Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 13/092,384

(22) Filed: Apr. 22, 2011

(65) Prior Publication Data

US 2011/0205909 A1   Aug. 25, 2011

Related U.S. Application Data

(63) Continuation of application No. PCT/CN2009/071786, filed on May 13, 2009.

(30) Foreign Application Priority Data

Oct. 23, 2008   (CN) .......................... 2008 1 0224690

(51) Int. Cl.
*H04L 12/26*   (2006.01)

(52) U.S. Cl.
CPC ............ *H04L 43/50* (2013.01); *H04L 12/2697* (2013.01)
USPC ........................................................ 370/248

(58) Field of Classification Search
USPC ............. 370/225, 248, 252; 455/11.1; 714/43
See application file for complete search history.

(56) References Cited

U.S. PATENT DOCUMENTS

| 7,260,107 B1 | 8/2007 | Sasaki et al. | |
| 7,463,591 B1 * | 12/2008 | Kompella et al. | 370/248 |
| 7,782,790 B1 * | 8/2010 | Nadeau et al. | 370/252 |

(Continued)

FOREIGN PATENT DOCUMENTS

| CN | 1529483 A | 9/2004 |
| CN | 1748381 A | 3/2006 |

(Continued)

OTHER PUBLICATIONS

Written Opinion of the International Searching Authority in corresponding PCT Application No. PCT/CN2009/071786 (Aug. 20, 2009).
International Search Report in corresponding PCT Application No. PCT/CN2009/071786 (Aug. 20, 2009).
Extended European Search Report in corresponding European Patent Application No. 09821515.5 (Mar. 8, 2012).

(Continued)

*Primary Examiner* — Pao Sinkantarakorn
*Assistant Examiner* — Richard K Chang
(74) *Attorney, Agent, or Firm* — Leydig, Voit & Mayer, Ltd.

(57) ABSTRACT

A method for obtaining link aggregation group (LAG) information, and a node and a system thereof are provided, which belong to the field of communication technologies. The method includes the following steps. An ingress node of a label switched path (LSP) sends an echo request message to another node on the LSP, in which the message carries identification information, and the identification information is for identifying that the LAG information on the LSP needs to be obtained. The ingress node receives an echo reply message returned by said another node, in which the message carries LAG information between said another node and a next hop node on the LSP. The present invention implements the obtaining of LAG information on the LSP and brings great convenience to OAM of MPLS network, and has the advantages of being simple, convenient, and easy to implement and having strong practicality.

9 Claims, 4 Drawing Sheets

(56) References Cited

U.S. PATENT DOCUMENTS

| | | |
|---|---|---|
| 7,903,554 B1 * | 3/2011 | Manur et al. ............... 370/230.1 |
| 2006/0155532 A1 | 7/2006 | Nam et al. |
| 2007/0280258 A1 * | 12/2007 | Rajagopalan et al. ..... 370/395.3 |
| 2009/0141622 A1 * | 6/2009 | Bitar ............................. 370/225 |
| 2009/0232152 A1 | 9/2009 | Chen |

FOREIGN PATENT DOCUMENTS

| | | |
|---|---|---|
| CN | 1941683 A | 4/2007 |
| CN | 101018228 A | 8/2007 |
| CN | 101102222 A | 1/2008 |
| EP | 1549023 B1 | 11/2007 |

OTHER PUBLICATIONS

Amante et al., "Operations and Maintenance Next Generation Requirements; draft-amante-oam-ng-requirements-01.txt," Feb. 2008, Internet Engineering Task Force, Freemont, California.

Kompella et al., "Detecting Multi-Protocol Label Switched (MPLS) Data Plane Failures," Standards Track, Feb. 2006, The Internet Society, Reston, Virginia.

Nadeau et al., "Extensions to RFC4379 in Support of Link Bundles; draft-nadeu-rfc4379-bis-link-bundle-00.txt," Standards Track, Oct. 2006, Internet Engineering Task Force, Freemont, California.

Viswanathan et al., "TraceFlow; draft-zinjuvadia-traceflow-02.txt," Standards Track, Aug. 2008, Internet Engineering Task Force, Freemont, California.

* cited by examiner

FIG. 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       LAG Req TLV Type        |           Length              |
+-+-+-+-+-+-+-+-+-+-+-+-+-+-+-+-+-+-+-+-+-+-+-+-+-+-+-+-+-+-+-+-+
|LAG identification|information           Reserve               |
+-+-+-+-+-+-+-+-+-+-+-+-+-+-+-+-+-+-+-+-+-+-+-+-+-+-+-+-+-+-+-+-+
```

FIG. 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       LAG Info TLV Type       |           Length              |
+-+-+-+-+-+-+-+-+-+-+-+-+-+-+-+-+-+-+-+-+-+-+-+-+-+-+-+-+-+-+-+-+
|   LAG count n  |                 Reserve                       |
+-+-+-+-+-+-+-+-+-+-+-+-+-+-+-+-+-+-+-+-+-+-+-+-+-+-+-+-+-+-+-+-+
|                       LAG Info sub-TLV 1                      |
+-+-+-+-+-+-+-+-+-+-+-+-+-+-+-+-+-+-+-+-+-+-+-+-+-+-+-+-+-+-+-+-+
|                       LAG Info sub-TLV 2                      |
+-+-+-+-+-+-+-+-+-+-+-+-+-+-+-+-+-+-+-+-+-+-+-+-+-+-+-+-+-+-+-+-+
|                             . . .                             |
+-+-+-+-+-+-+-+-+-+-+-+-+-+-+-+-+-+-+-+-+-+-+-+-+-+-+-+-+-+-+-+-+
|                             . . .                             |
+-+-+-+-+-+-+-+-+-+-+-+-+-+-+-+-+-+-+-+-+-+-+-+-+-+-+-+-+-+-+-+-+
|                             . . .                             |
+-+-+-+-+-+-+-+-+-+-+-+-+-+-+-+-+-+-+-+-+-+-+-+-+-+-+-+-+-+-+-+-+
|                       LAG Info sub-TLV n                      |
+-+-+-+-+-+-+-+-+-+-+-+-+-+-+-+-+-+-+-+-+-+-+-+-+-+-+-+-+-+-+-+-+
```

FIG. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      LAG Info sub-TLV Type         |             Length        |
+-+-+-+-+-+-+-+-+-+-+-+-+-+-+-+-+-+-+-+-+-+-+-+-+-+-+-+-+-+-+-+-+
|   Count of physical links m        |          Reserve          |
+-+-+-+-+-+-+-+-+-+-+-+-+-+-+-+-+-+-+-+-+-+-+-+-+-+-+-+-+-+-+-+-+
|                     Local interface identifier                 |
+-+-+-+-+-+-+-+-+-+-+-+-+-+-+-+-+-+-+-+-+-+-+-+-+-+-+-+-+-+-+-+-+
|                   Next hop interface identifier                |
+-+-+-+-+-+-+-+-+-+-+-+-+-+-+-+-+-+-+-+-+-+-+-+-+-+-+-+-+-+-+-+-+
|                      Total bandwidth of LAG                    |
+-+-+-+-+-+-+-+-+-+-+-+-+-+-+-+-+-+-+-+-+-+-+-+-+-+-+-+-+-+-+-+-+
|                     Bandwidth of physical Link 1               |
+-+-+-+-+-+-+-+-+-+-+-+-+-+-+-+-+-+-+-+-+-+-+-+-+-+-+-+-+-+-+-+-+
|                               . . .                            |
+-+-+-+-+-+-+-+-+-+-+-+-+-+-+-+-+-+-+-+-+-+-+-+-+-+-+-+-+-+-+-+-+
|                     Bandwidth of physical Link m               |
+-+-+-+-+-+-+-+-+-+-+-+-+-+-+-+-+-+-+-+-+-+-+-+-+-+-+-+-+-+-+-+-+
|                               . . .                            |
+-+-+-+-+-+-+-+-+-+-+-+-+-+-+-+-+-+-+-+-+-+-+-+-+-+-+-+-+-+-+-+-+
|                    |
+-+-+-+-+-+-+-+-+-+-+-+-+-+
```

METHOD, NODE AND SYSTEM FOR OBTAINING LINK AGGREGATION GROUP INFORMATION

CROSS-REFERENCE TO RELATED APPLICATIONS

This application is a continuation of International Application No. PCT/CN2009/071786, filed on May 13, 2009, which claims priority to Chinese Patent Application No. 200810224690.3, filed on Oct. 23, 2008, both of which are hereby incorporated by reference in their entireties.

FIELD OF THE INVENTION

The present invention relates to the field of communication technologies, and in particular, to a method, a node and a system for obtaining link aggregation group (LAG) information.

BACKGROUND OF THE INVENTION

Multi-Protocol Label Switching (MPLS) belongs to the $3^{rd}$ generation network architecture, and is a new generation Internet Protocol (IP) high-speed backbone network exchange standard. A basic constituent unit of an MPLS network is a label switching router (LSR), and a forwarding path of an MPLS message in the MPLS network is a label switched path (LSP), and the working process of the network is as the following. At an ingress LSR, packets with the same forwarding and processing mode are classified into a forwarding equivalence class (FEC), and an identifier is added for each packet to form a labeled packet, and the label is used for uniquely identifying an FEC to which a packet belongs. The ingress LSR forwards the labeled packet to a next hop on the LSP according to the label on the packet and a preset label forwarding table, at each subsequent hop, an output port of the next hop and a new label are pointed out by using the label as a pointer without analyzing the packet header, and the labeled packet is forwarded through a designated output port after replacing the old label with a new label. At an egress LSR, the label in the packet is removed, and the packet is then forwarded according to a route table.

In order to determine whether an LSP can correctly forward data, the MPLS Ping technology may be adopted for detection, that is, an echo request message is sent from an ingress LSR, and is forwarded by the LSP and reaches an egress, and then an echo reply message is returned by an egress LSR, and if the ingress LSR receives the echo reply message, the LSP can be used for data forwarding. In order to obtain the information of each node at the ingress node, the MPLS TraceRoute technology may be adopted, that is, echo request messages with time to live (TTL) of 1 to a certain value are continuously sent on the LSP, so that each node on the LSP returns an echo reply message when receiving an echo request message with expired TTL, and carries information of the node in the echo reply message, and therefore the ingress node may collect the information of each node on the LSP.

According to the link aggregation group (LAG) technology, multiple physical links between two adjacent devices are used as a logical link, so as to realize link redundancy and load balancing between the two devices, thereby providing a wider bandwidth.

After analyzing the conventional art, the inventors find the following problems.

In conventional art, it cannot be detected that whether an LAG and attribute information of the LAG exist on the LSP, and therefore the difficulty in operation, administration and maintenance (OAM) of the MPLS network is increased. For example, if an LAG exists between two adjacent devices, and three physical links are included therebetween, when one of the physical links fails, and the other two physical links are normal, if an OAM message is transferred to the peer end through the failed physical link in the LAG, the peer end will make a conclusion that a failure occurs to the LAG; however, in fact, the other two physical links on the LAG can still work normally, so the conclusion made by the peer end is not completely correct.

SUMMARY OF THE INVENTION

In order to obtain LAG information on an LSP, embodiments of the present invention provide a method, a node and a system for obtaining LAG information. The technical solutions of the present invention are as follows.

An embodiment of the present invention provides a method for obtaining LAG information, where the method includes:

sending, by an ingress node of an LSP, an echo request message to another node on the LSP, and carrying identification information in the echo request message, where the identification information is for identifying that the LAG information on the LSP needs to be obtained; and receiving, by the ingress node, an echo reply message returned by said another node, where the echo reply message carries LAG information between said another node and a next hop node on the LSP.

An embodiment of the present invention further provides a node, where the node includes:

a sending module, configured to send an echo request message to another node on an LSP, and carry identification information in the echo request message, where the identification information is for identifying that the LAG information on the LSP needs to be obtained; and a receiving module, configured to receive an echo reply message returned by said another node, where the echo reply message carries the LAG information between said another node and a next hop node on the LSP.

An embodiment of the present invention further provides a node, where the node includes:

a receiving module, configured to receive an echo request message sent by an ingress node of an LSP, where the echo request message carries identification information, and the identification information is for identifying that the LAG information on the LSP needs to be obtained;

an obtaining module, configured to determine, according to the identification information in the echo request message received by the receiving module, whether the LAG information needs to be obtained, and if the LAG information needs to be obtained, obtain the LAG information between the node and a next hop node on the LSP; if the LAG information does not need to be obtained, not obtain the LAG information between the node and a next hop node on the LSP; and a sending module, configured to carry the LAG information obtained by the obtaining module in an echo reply message, and return the echo reply message to the ingress node.

An embodiment of the present invention further provides a system for obtaining LAG information, where the system includes an ingress node and another node, and the ingress node and said another node are located on an LSP corresponding to the same FEC;

the ingress node is configured to send an echo request message to said another node, carry identification information in the echo request message, and receive an echo reply message returned by said another node, where the echo reply message carries LAG information between said another node and a next hop node on the LSP, and the identification information is for identifying that the LAG information on the LSP needs to be obtained; and said another node is configured to receive the echo request message sent by the ingress node, determine, according to the identification information carried in the echo request message, whether the LAG information needs to be obtained, and if the LAG information needs to be obtained, obtain the LAG information between said another node and a next hop node on the LSP, carry the LAG information in an echo reply message, and return the echo reply message to the ingress node; if the LAG information does not need to be obtained, not obtain the LAG information between said another node and the next hop node on the LSP.

According to embodiments of the present invention, an ingress node sends an echo request message carrying identification information to another node on an LSP, and receives an echo reply message carrying LAG information returned by said another node, and therefore the obtaining of the LAG information on the LSP is realized, and great convenience is brought to OAM of an MPLS network. The present invention has the advantages of being simple, convenient, and easy to implement and having strong practicality.

BRIEF DESCRIPTION OF THE DRAWINGS

To illustrate the technical solutions according to embodiments of the present invention or in the conventional art more clearly, the accompanying drawings required for describing the embodiments or the conventional art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

The technical solution of the present invention is hereinafter described in detail with reference to the accompanying drawings. It is evident that the embodiments are only some exemplary embodiments of the present invention, and the present invention is not limited to such embodiments. Other embodiments that those skilled in the art obtain based on embodiments of the present invention also fall within the protection scope of the present invention.

An embodiment of the present invention provides a method for obtaining LAG information, which includes: sending, by an ingress node of an LSP, an echo request message to another node on the LSP, and carrying identification information in the echo request message, where the identification information is for identifying that the LAG information on the LSP needs to be obtained; and, receiving, by the ingress node, an echo reply message returned by said another node, where the echo reply message carries LAG information between said another node and a next hop node on the LSP.

In the embodiment of the present invention, both the echo request message and the echo reply message include Type Length Values (TLVs) field, and the TLVs field is classified into various types, for example, an FEC TLV field, and in practical application, the TLVs field may includes one or more TLV sub-fields according to the requirement. In the embodiment of the present invention, the TLVs field in the echo request message includes an FEC TLV field.

In the embodiment of the present invention, an LAG TLV field is newly added to realize the carrying of LAG relevant information, and a system capable of recognizing the LAG TLV field is taken as an example for description, but the present invention does not exclude that the system not supporting the obtaining of LAG receives a message carrying the LAG information, and generally, the system will discard the LAG TLV field without processing.

Figure 1:
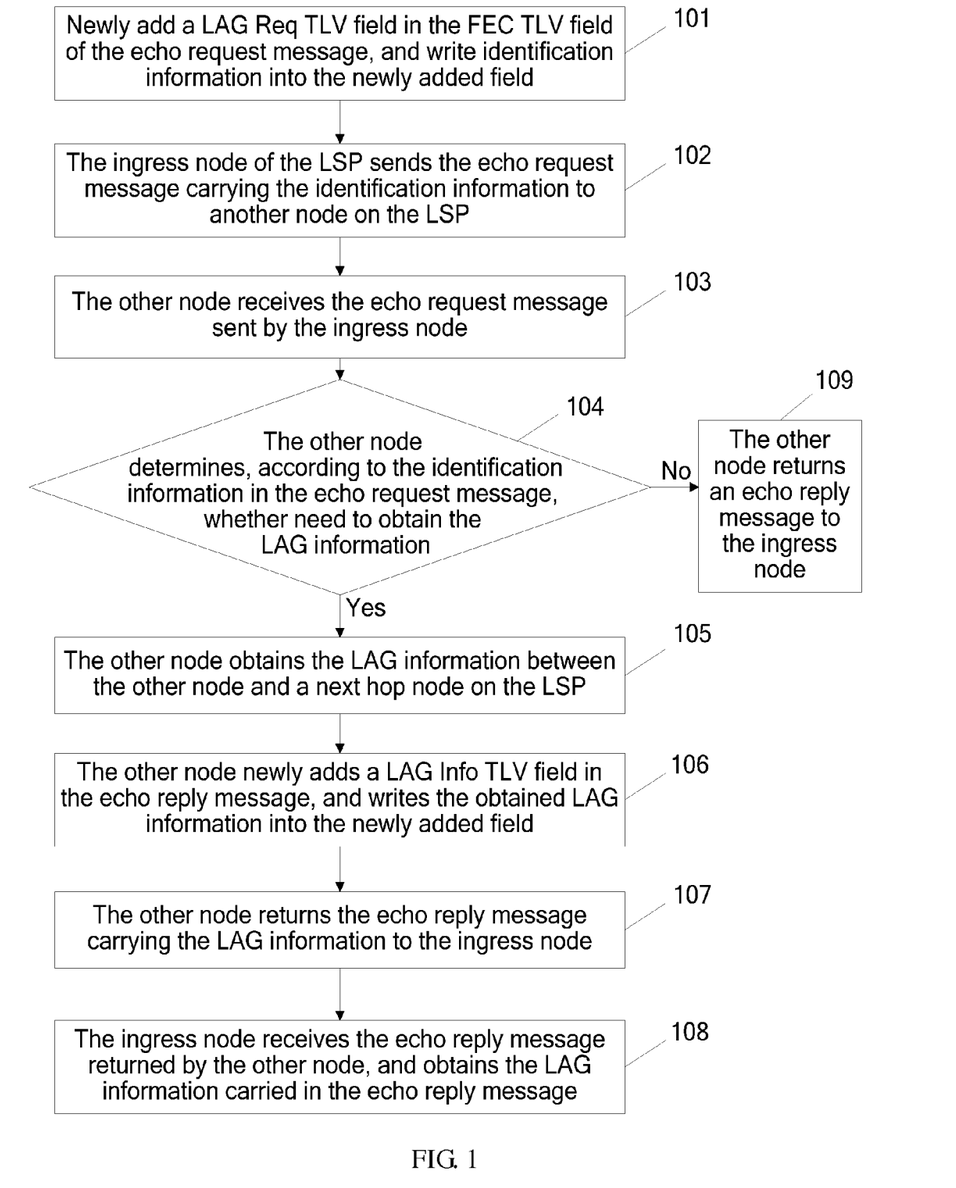
FIG. 1 is a flow chart of a method for obtaining LAG information according to an embodiment of the present invention.

Referring to FIG. 1, the method for obtaining LAG information of the present invention includes the following steps In step 101, an LAG Req TLV field is newly added in the FEC TLV field of the echo request message, identification information is written into the LAG Req TLV field, where the identification information is for identifying whether the LAG information on the LSP needs to be obtained, and in this embodiment, identify that the LAG information on the LSP needs to be obtained.

For example, the identification information may be set to be 1, identifying that the LAG information on the LSP needs to be obtained, or the identification information may be set to be 0, identifying that the LAG information on the LSP does not need to be obtained.

Figure 2:
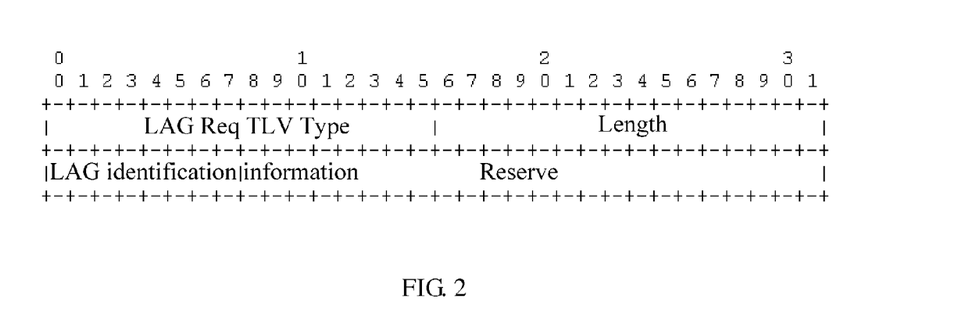
FIG. 2 is a schematic view of a format of an LAG TLV field newly added in an FEC TLV field or a TLVs field of an echo request message according to an embodiment of the present invention.

Specifically, FIG. 2 is a schematic view of a format of an LAG Req TLV sub-field newly added in an FEC TLV field. LAG Req TLV Type represents that the type of the current TLV is a TLV identifying the LAG request, belongs to a sub-field of the FEC TLVfield, and has a value allocated by the Internet Assigned Numbers Authority (IANA). Length represents a total length of the LAG Req TLV field. LAG identification information is an identification bit for identifying whether the LAG information on the LSP needs to be obtained.

In this embodiment, in addition to the mode of extending the existing FEC TLV field, a mode of newly adding TLV may also be adopted to extend the echo request message, which includes: newly adding an LAG Req TLV field in the echo request message, and writing the identification information into the LAG Req TLV field.

Specifically, further referring to FIG. 2, a format of the newly added LAG Req TLV field in the TLVs field of the echo request message is the same as that of the newly added LAG Req TLV sub-field in the FEC TLV field. LAG Req TLV Type represents that the type of the current TLV is a TLV identifying the LAG request, and has a value allocated by the IANA; Length represents a total length of the LAG Req TLV field; LAG identification information is an identification bit for identifying whether the LAG information on the LSP needs to be obtained; and reserved bits in FIG. 2 may be all 0s, or be reserved for later use.

In step 102, the ingress node of the LSP sends the echo request message carrying the identification information to another node on the LSP.

In step 103, said another node receives the echo request message sent by the ingress node.

In step 104, said another node determines, according to the identification information in the echo request message, whether the LAG information needs to be obtained, and if the LAG information needs to be obtained, step 105 is performed; if the LAG information does not need to be obtained, step 109 is performed.

In step 105, said another node obtains the LAG information between the node and a next hop node on the LSP, and generally, the node on the LSP knows the next hop node and locally stores the LAG information between the node and the next hop node. For example, the ingress node on the LSP is A, A sends an echo request message to an intermediate node B, a next hop of B is a node C, an LAG exists between nodes B and C, and the node B locally obtains the LAG information.

In this embodiment, the LAG information between said another node and the next hop node on the LSP at least includes one of the following information: the number of LAGs between said another node and the next hop node on the LSP, and information of physical links in each LAG.

The information of the physical links in the LAG at least includes one of the following information: the number of the physical links, identifiers of interfaces at two ends of the LAG, a total bandwidth of the LAG, a bandwidth of each physical link, and a maximum transmission unit (MTU) of each physical link.

In step 106, said another node newly adds an LAG TLV field in the echo reply message, and writes the obtained LAG information into the LAG TLV field.

Figure 3:
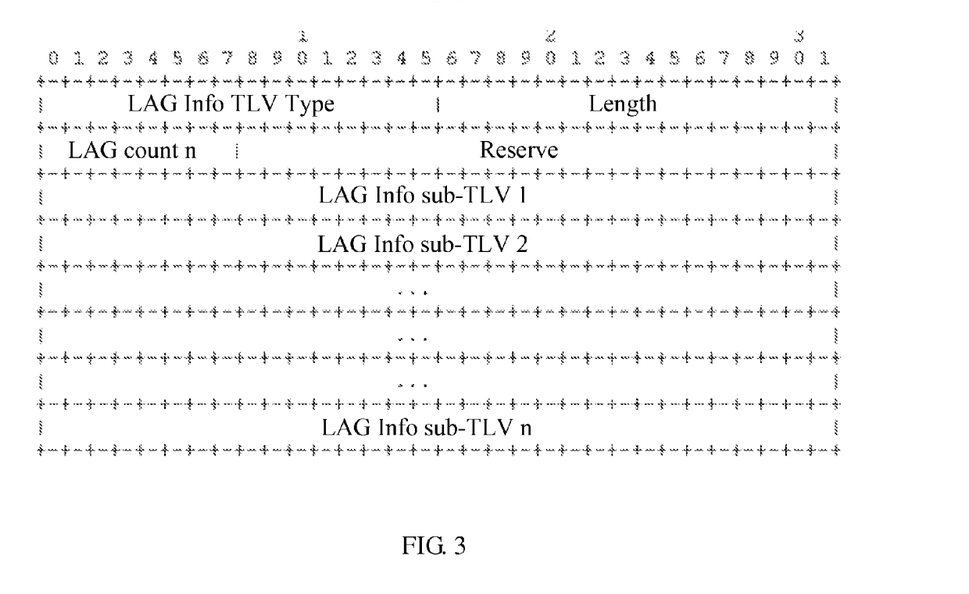
FIG. 3 is a schematic view of a format of an LAG TLV field newly added in a TLVs field of an echo reply message according to an embodiment of the present invention.

Specifically, FIG. 3 is a schematic view of a format of an LAG Info TLV field newly added in the TLVs field of an echo reply message. LAG Info TLV Type represents that the type of the current TLV is a TLV identifying the attribute information of the LAG, and has a value allocated by the IANA; Length represents a total length of the LAG Info TLV field; LAG count represents the number of LAGs between said another node and the next hop node, for example, n, and LAG Info Sub-TLV 1, LAG Info Sub-TLV 2, . . . , and LAG Info Sub-TLV n are information of each LAG in the n LAGs; and reserved bits in FIG. 3 may be all 0s, or be reserved for later use.

Figure 4:
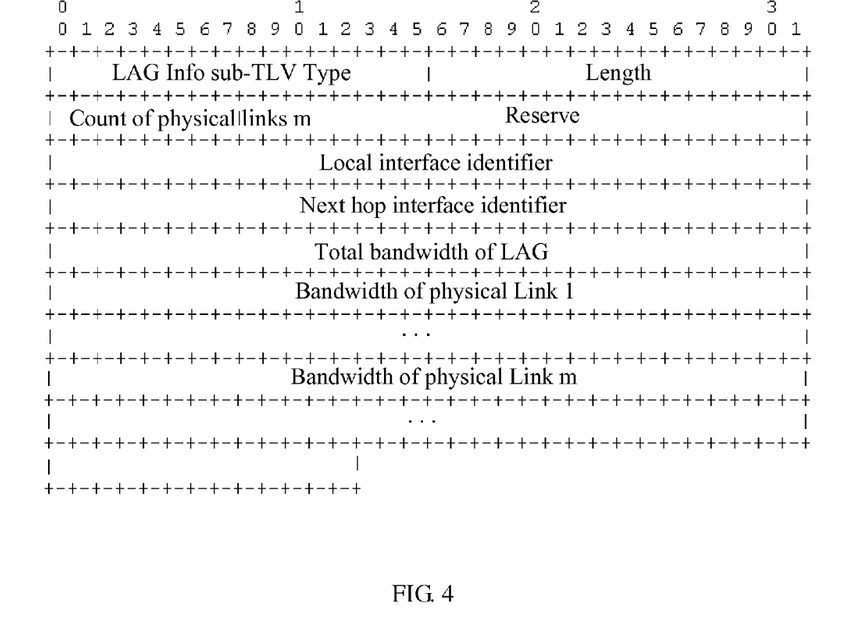
FIG. 4 is a schematic view of a format of LAG information according to an embodiment of the present invention.

As for the information format of each LAG, reference may be made to FIG. 4. LAG Info Sub-TLV Type represents that the type of the current TLV is a TLV identifying attribute information of each LAG in multiple LAGs, is a sub-field of the newly added LAG TLV field, and has value allocated by the IANA; Length represents a length of the LAG Info Sub-TLV field, a count m of the physical links is the number of the physical links in the current LAG, a local interface identifier is a local interface identifier of the LAG, a next hop interface identifier is an interface identifier of the LAG at a next hop, and a total bandwidth of the LAG and a bandwidth of the physical links in the LAG are also included; and reserved bits in FIG. 4 may be all 0s, or be reserved for later use.

In this embodiment, the interface identifier of the LAG includes, for example, but is not limited to, an interface IPv4/IPv6 address and an interface ID/index. Furthermore, in this embodiment, it is not excluded that other information, for example, MTU information of the physical links, is further carried in the echo reply message.

In step 107, said another node returns the echo reply message carrying the LAG information to the ingress node.

In step 108, the ingress node receives the echo reply message returned by said another node, and obtains the LAG information between said another node and the next hop node on the LSP from the echo reply message, and the process ends.

In step 109, said another node returns an echo reply message to the ingress node, and the process ends.

Furthermore, the ingress node may also send echo request messages with different TTL values, so as to obtain the LAG information of multiple nodes on the LSP. For example, the LSP has nodes A, B, . . . , N. Firstly, an ingress node A sends an echo request message of TTL=1, and a next hop node B of A returns an echo reply message carrying LAG information between B and C to A; then, A sends an echo request message of TTL=2, and C returns an echo reply message carrying LAG information between C and D to A; likewise, finally, A sends an echo request message of TTL=N−1, and N returns an echo reply message to A; therefore, A may obtain the echo reply message returned by each node on the LSP, and obtain all the LAG information on the LSP.

According to the method of this embodiment, the ingress node sends the echo request message carrying the identification information to another node on the LSP, and receives the echo reply message carrying the LAG information returned by said another node, and therefore, the obtaining of the LAG information on the LSP is realized. Compared with the prior art, not only whether an LAG exists on the LSP is detected, but also the information of the LAG is obtained, which brings great convenience to OAM of the MPLS network, and is beneficial to analysis and location of LSP failures, for better use, management, and maintenance of the MPLS network. The two modes of extending the echo request message may be applied flexibly. Furthermore, the LAG information obtained in this embodiment may also be applied to scenarios of establishing LSPs not including the LAG, and according to the obtained LAG information, selection of node and establishment of LSP may be performed conveniently with strong practicality.

Figure 5:
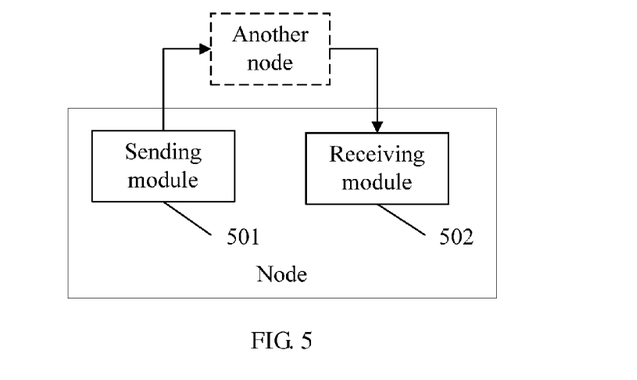
FIG. 5 is a structural view of a node according to an embodiment of the present invention.

Referring to FIG. 5, an embodiment of the present invention provides a node, where the node includes:

a sending module 501, configured to send an echo request message to another node on an LSP, and carry identification information in the echo request message, where the identification information is for identifying that the LAG information on the LSP needs to be obtained; and a receiving module 502, configured to receive an echo reply message returned by said another node, where the echo reply message carries the LAG information between said another node and a next hop node on the LSP.

Figure 6:
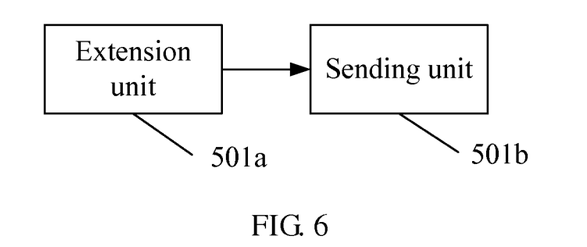
FIG. 6 is a structural view of a sending module according to an embodiment of the present invention.

Furthermore, referring to FIG. 6, the sending module 501 includes:

an extension unit 501a, configured to newly add an LAG TLV sub-field in an FEC TLV field of the echo request message, and write the identification information into the LAG TLV field, where the identification information is for identifying that the LAG information on the LSP needs to be obtained; and a sending unit 501*b*, configured to send the echo request message obtained by the extension unit 501*a* to said another node on the LSP.

Figure 7:
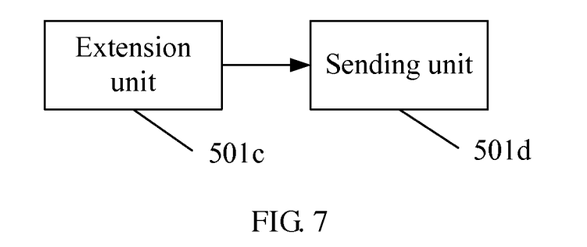
FIG. 7 is another structural view of the sending module according to an embodiment of the present invention.

Or, referring to FIG. 7, the sending module 501 includes:

an extension unit 501*c*, configured to newly add an LAG TLV field in the echo request message, and write the identification information into the LAG TLV field, where the identification information is for identifying that the LAG information on the LSP needs to be obtained; and a sending unit 501*d*, configured to send the echo request message obtained by the extension unit 501*c* to said another node on the LSP.

The node of this embodiment is an ingress node on the LSP.

In this embodiment, both the format of the LAG Req TLV sub-field newly added in the FEC TLV field of the echo request message and the format of the LAG TLV field newly added in the echo request message are as shown in FIG. 2, and the details are the same as those described in the embodiment in FIG. 1, and will not be repeated herein.

Furthermore, the node of this embodiment may also send echo request messages with different TTL values, so that a corresponding node on the LSP returns an echo reply message carrying the LAG information after receiving the echo request message, and therefore the LAG information of multiple nodes on the LSP is obtained.

According to this embodiment, the node sends the echo request message carrying the identification information to said another node on the LSP and receives the echo reply message carrying the LAG information returned by said another node, and therefore the obtaining of the LAG information on the LSP is realized. Compared with the prior art, not only whether an LAG exists on the LSP is detected, but also the information of the LAG is obtained, which brings great convenience to OAM of the MPLS network, and is beneficial to analysis and location of LSP failures, for better use, management, and maintenance of the MPLS network. The two modes of extending the echo request message may be applied flexibly. Furthermore, the LAG information obtained in this embodiment may also be applied to scenarios of establishing LSPs not including the LAG, and according to the obtained LAG information, selection of node and establishment of LSP may be performed conveniently with strong practicality.

Figure 8:
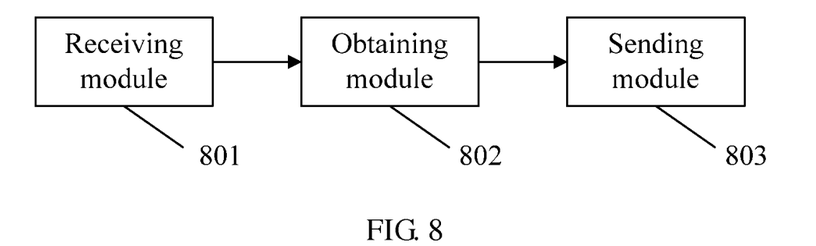
FIG. 8 is another structural view of the node according to an embodiment of the present invention.

Referring to FIG. 8, an embodiment of the present invention further provides a node, where the node includes:

a receiving module 801, configured to receive an echo request message sent by an ingress node of an LSP, where the echo request message carries identification information, and the identification information is for identifying that the LAG information on the LSP needs to be obtained;

an obtaining module 802, configured to determine, according to the identification information in the echo request message received by the receiving module 801, whether the LAG information needs to be obtained, and if the LAG information needs to be obtained, obtain the LAG information between the node and a next hop node on the LSP; if the LAG information does not need to be obtained, not obtain the LAG information between the node and a next hop node on the LSP; and a sending module 803, configured to carry the LAG information obtained by the obtaining module 802 in an echo reply message, and send the echo reply message to the ingress node.

Figure 9:
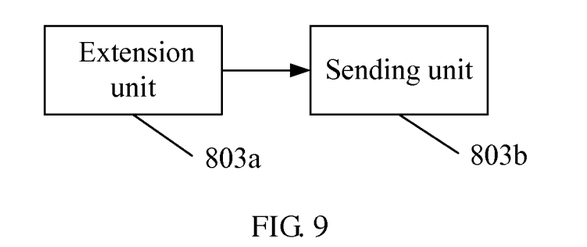
FIG. 9 is still another structural view of the sending module according to an embodiment of the present invention.

Furthermore, referring to FIG. 9, the sending module 803 includes:

an extension unit 803*a*, configured to newly add an LAG TLV field in the echo reply message; and a sending unit 803*b*, configured to write the LAG information obtained by the obtaining module 802 into the LAG TLV field obtained by the extension unit, and send the echo reply message to the ingress node.

The node of this embodiment is another node or other nodes on the LSP except the ingress node, and includes an egress node.

In this embodiment, the format of the LAG Info TLV field newly added in the echo reply message is as shown in FIGS. 3 and 4, and the LAG information filled in the field includes various types of information. The details are the same as those described in the embodiment in FIG. 1, and will not be repeated herein.

The node of this embodiment receives the echo request message carrying the identification information, and returns the echo reply message carrying the LAG information, and therefore the obtaining of the LAG information on the LSP is realized. Compared with the prior art, not only whether an LAG exists on the LSP is detected, but also the information of the LAG is obtained, which brings great convenience to OAM of the MPLS network, and is beneficial to analysis and location of LSP failures, for better use, management, and maintenance of the MPLS network. Furthermore, the LAG information obtained in this embodiment may also applied to scenarios of establishing LSPs not including the LAG, and according to the obtained LAG information, selection of node and establishment of LSP may be performed conveniently with strong practicality.

Figure 10:
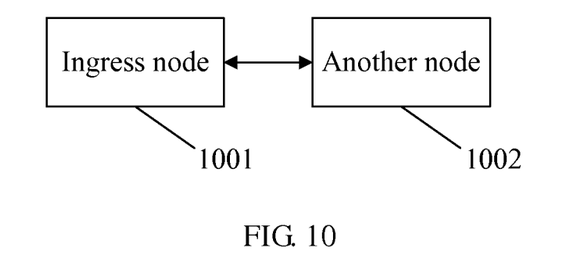
FIG. 10 is a structural view of a system for obtaining LAG information according to an embodiment of the present invention.

Referring to FIG. 10, an embodiment of the present invention further provides a system for obtaining LAG information, where the system includes an ingress node 1001 and another node 1002, and the ingress node 1001 and said another node 1002 are located on the LSP corresponding to the same FEC.

One FEC may correspond to multiple LSPs, and the multiple LSPs are equivalent. The ingress node 1001 and said another node 1002 may be located on the same LSP corresponding to the same FEC, and may also be located on different LSPs corresponding to the FEC.

The ingress node 1001 is configured to send an echo request message to said another node 1002, carry identification information in the echo request message, and receive an echo reply message returned by said another node 1002, where the echo reply message carries LAG information between said another node 802 and a next hop node on the LSP, and the identification information is for identifying that the LAG information on the LSP needs to be obtained.

Said another node 1002 is configured to receive an echo request message sent by the ingress node 1001, and determine, according to the identification information carried in the echo request message, whether the LAG information needs to be obtained, and if the LAG information needs to be obtained, obtain the LAG information between said another node 1002 and a next hop node on the LSP, carry the LAG information in an echo reply message, and return the echo reply message to the ingress node 1001; if the LAG information does not need to be obtained, not obtain the LAG information between said another node 1002 and a next hop node on the LSP.

In this embodiment, the ingress node 1001 may carry the identification information by the mode of newly adding the LAG Req TLV sub-field in the FEC TLV field of the echo request message, or by the mode of newly adding the LAG ReqTLV field in the echo request message, as shown in FIG. 2; moreover, the ingress node 1001 may send echo request messages with different TTL values, so that a corresponding node on the LSP returns an echo reply message carrying the LAG information after receiving the echo request message, and therefore the LAG information of multiple nodes on the LSP is obtained; and the details are the same as those described in the embodiment in FIG. 1, and will not be repeated herein.

Said another node 1002 is another node or other nodes on the LSP except the ingress node 1001, and includes an egress node. Said another node 1002 may carry the LAG information in the mode of newly adding the LAG Info TLV field in the echo reply message, as shown in FIGS. 3 and 4, and the LAG information filled in the field includes various types of information. Details are the same as those described in the embodiment in FIG. 1, and will not be repeated herein.

The system of this embodiment sends the echo request message carrying the identification information through the ingress node to said another node on the LSP, and receives the echo reply message carrying the LAG information returned by said another node, and therefore the obtaining of the LAG information on the LSP is realized. Compared with the prior art, not only whether an LAG exists on the LSP is detected, but also the information of the LAG is obtained, which brings great convenience to OAM of the MPLS network, and is beneficial to analysis and location of LSP failures, for better use, management, and maintenance of the MPLS network. The two modes of extending the echo request message may be applied flexibly. Furthermore, the LAG information obtained in this embodiment may also be applied to scenarios of establishing LSPs not including the LAG, and according to the obtained LAG information, selection of node and establishment of LSP may be performed conveniently with strong practicality.

Those of ordinary skill in the art should understand that all or a part of the steps of the method according to the embodiments of the present invention may be implemented by a program instructing relevant hardware. The program may be stored in a computer readable storage medium. When the program is run, one of steps or a combination of steps of the method according to the embodiments of the present invention is performed.

In addition, the functional units in the embodiments of the present invention may be integrated in one processing module or may each be an independent physical entity, or two or more units are integrated in one module. The integrated module may be accomplished through hardware or a software functional module. If the integrated module is accomplished through the software functional module and is sold or used as a separate product, the integrated module may be stored in a computer readable storage medium.

The storage medium may be a Read-Only Memory (ROM), a magnetic disk or a Compact Disk Read-Only Memory (CD-ROM).

The above descriptions are merely some exemplary embodiments of the present invention, but not intended to limit the scope of the present invention. Any modification, equivalent replacement, or improvement that can be easily thought of by persons skilled in the art should fall within the scope of the present invention.

What is claimed is:

1. A method for obtaining link aggregation group (LAG) information, comprising:
    sending, by an ingress node of a label switched path (LSP), an echo request message to another node on the LSP, and carrying identification information in the echo request message, wherein the identification information is for identifying the LAG information on the LSP which needs to be obtained; and
    receiving, by the ingress node, an echo reply message returned by said another node, wherein the echo reply message carries the LAG information between said another node and a next hop node on the LSP;
    wherein after the ingress node of the LSP sends the echo request message to said another node on the LSP, the method further comprises:
    receiving, by said another node, the echo request message;
    determining according to the identification information in the echo request message, by said another node, whether the LAG information needs to be obtained; and
    if the LAG information needs to be obtained, obtaining the LAG information between said another node and the next hop node on the LSP, carrying the LAG information in the echo reply message, and returning the echo reply message to the ingress node;
    if the LAG information does not need to be obtained, not obtaining the LAG information between said another node and the next hop node on the LSP.

2. The method for obtaining LAG information according to claim 1, wherein the carrying the identification information in the echo request message comprises:
    newly adding an LAG type length value (TLV) sub-field in a forwarding equivalence class (FEC) TLV field of the echo request message; and
    writing the identification information into the LAG TLV sub-field.

3. The method for obtaining LAG information according to claim 1, wherein carrying the identification information in the echo request message comprises:
    newly adding an LAG type length value (TLV) field in the echo request message; and
    writing the identification information into the LAG TLV field.

4. The method for obtaining LAG information according to claim 1, wherein said another node carrying the obtained LAG information in the echo reply message comprises:
    newly adding, by said another node, an LAG type length value (TLV) field in the echo reply message;
    writing the obtained LAG information into the LAG TLV field.

5. The method for obtaining LAG information according to claim 1, wherein the LAG information between said another node and the next hop node on the LSP at least comprises one of the following information:
    the number of LAGs between said another node and the next hop node on the LSP, and information of physical links in each LAG.

6. The method for obtaining LAG information according to claim 5, wherein the information of the physical links in the LAG at least comprises one of the following information:
    the number of the physical links, identifiers of interfaces at two ends of the LAG, a total bandwidth of the LAG, a bandwidth of each physical link, and a maximum transmission unit (MTU) of each physical link.

7. A system for obtaining link aggregation group (LAG) information, comprising: an ingress node and another node, wherein the ingress node and said another node are located on a label switched path (LSP) corresponding to the same forwarding equivalence class (FEC);
    the ingress node is configured to send an echo request message to said another node, carry identification information in the echo request message, and receive an echo reply message returned by said another node, wherein the echo reply message carries the LAG information between said another node and a next hop node on the LSP, and the identification information is for identifying whether the LAG information on the LSP needs to be obtained; and said another node is configured to receive the echo request message sent by the ingress node, determine, according to the identification information carried in the echo request message, whether the LAG information needs to be obtained, and if the LAG information needs to be obtained, obtain the LAG information between said another node and the next hop node on the LSP, carry the LAG information in the echo reply message, and return the echo reply message to the ingress node; if the LAG information does not need to be obtained, not obtain the LAG information between said another node and the next hop node on the LSP.

8. The system for obtaining LAG information according to claim 7, wherein the LAG information between said another node and the next hop node on the LSP comprises at least one of the following information:

a quantity of LAGs between said another node and the next hop node on the LSP, and information of physical links in each LAG.

9. The system for obtaining LAG information according to claim 8, wherein the information of the physical links in each LAG at least comprises one of the following information:

a quantity of the physical links, identifiers of interfaces at two ends of each LAG, a total bandwidth of each LAG, a bandwidth of each physical link, and a maximum transmission unit (MTU) of each physical link.

* * * * *